United States Patent
Ishwar et al.

(10) Patent No.: US 7,519,056 B2
(45) Date of Patent: Apr. 14, 2009

(54) MANAGING TRAFFIC IN A MULTIPORT NETWORK NODE USING LOGICAL PORTS

(75) Inventors: Prashanth Ishwar, Santa Clara, CA (US); Ajay Gaonkar, Sunnyvale, CA (US); Apurva Mehta, Cupertino, CA (US); Rajagopalan Subbiah, San Jose, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 989 days.

(21) Appl. No.: 10/455,510

(22) Filed: Jun. 4, 2003

(65) Prior Publication Data

US 2004/0017816 A1 Jan. 29, 2004

Related U.S. Application Data

(60) Provisional application No. 60/385,862, filed on Jun. 4, 2002.

(51) Int. Cl.
*H04L 12/28* (2006.01)
*G06F 15/16* (2006.01)

(52) U.S. Cl. .................. 370/389; 370/235; 370/386; 370/401; 370/228; 370/395.53; 709/203; 709/227; 709/243

(58) Field of Classification Search ................ 370/389, 370/395.53, 235, 410, 386, 401, 228; 709/203, 709/227, 243
See application file for complete search history.

(56) References Cited

U.S. PATENT DOCUMENTS

| | | | |
|---|---|---|---|
| 5,867,666 A | | 2/1999 | Harvey |
| 6,385,197 B1 | | 5/2002 | Sugihara |
| 6,394,292 B1 | * | 5/2002 | Sabounjian ................ 211/202 |
| 6,430,621 B1 | * | 8/2002 | Srikanth et al. ............. 709/238 |
| 6,496,502 B1 | * | 12/2002 | Fite et al. .................... 370/389 |
| 6,785,272 B1 | * | 8/2004 | Sugihara ..................... 370/386 |
| 6,934,292 B1 | * | 8/2005 | Ammitzboell .............. 370/400 |
| 7,002,977 B1 | * | 2/2006 | Jogalekar .................... 370/410 |
| 7,072,346 B2 | * | 7/2006 | Hama ..................... 370/395.53 |
| 7,411,904 B2 | * | 8/2008 | Foote et al. ................. 370/230 |
| 7,428,237 B1 | * | 9/2008 | Gai et al. ............... 370/395.53 |

(Continued)

OTHER PUBLICATIONS

Riverstone Networks, Inc. MPLS based Transparent LAN Services, © 2000 Riverstone Networks, Inc.Printed in the USA 5200 Great America Parkway, Santa Clara, CA 95054 USA408 / 878-6500 or www.riverstonenet.com.*

(Continued)

*Primary Examiner*—Edan Orgad
*Assistant Examiner*—Venkatesh Haliyur

(57) ABSTRACT

A technique for implementing VLANs across a service provider network involves establishing logical ports that have bindings to transport tunnels. The logical ports are then treated the same as physical ports in defining broadcast domains at particular service provider edge devices. Logical ports can be established for Layer 2 transport tunnels that use stacked VLAN tunneling and MPLS tunneling. Establishing a logical port that uses stacked VLAN tunneling involves binding a physical port and a stacked VLAN tunnel to the logical port. Establishing a logical port that uses MPLS tunneling involves binding an MPLS tunnel to a logical port. In one embodiment, the logical port is bound to a static MPLS tunnel and in another embodiment, the logical port is bound to a dynamic MPLS tunnel and the destination IP address of the destination service provider edge device.

25 Claims, 15 Drawing Sheets

U.S. PATENT DOCUMENTS

| | | | |
|---|---|---|---|
| 2002/0027906 A1 | 3/2002 | Athreya et al. | |
| 2002/0101868 A1* | 8/2002 | Clear et al. | 370/389 |
| 2002/0110087 A1* | 8/2002 | Zelig et al. | 370/236 |
| 2002/0141421 A1 | 10/2002 | Dupont | |
| 2002/0176415 A1* | 11/2002 | Holden et al. | 370/389 |
| 2002/0184387 A1* | 12/2002 | Yamaya et al. | 709/238 |
| 2003/0026271 A1* | 2/2003 | Erb et al. | 370/401 |
| 2003/0110268 A1* | 6/2003 | Kermarec et al. | 709/227 |
| 2003/0133412 A1* | 7/2003 | Iyer et al. | 370/235 |
| 2003/0206548 A1* | 11/2003 | Bannai et al. | 370/389 |
| 2004/0078469 A1* | 4/2004 | Ishwar et al. | 709/227 |
| 2005/0018605 A1* | 1/2005 | Foote et al. | 370/230 |

OTHER PUBLICATIONS

Martini, Luca et al., "Transport of Layer 2 Frames Over MPLS", draft-martini-l2circuit-trans-mpls-09.txt, Apr. 2002.

* cited by examiner

MANAGING TRAFFIC IN A MULTIPORT NETWORK NODE USING LOGICAL PORTS

CROSS-REFERENCE TO RELATED APPLICATION

This application is entitled to the benefit of provisional Patent Application Ser. No. 60/385,862, filed 4 Jun. 2002.

FIELD OF THE INVENTION

The invention relates generally to a technique for managing traffic in a multiport network node, and more particularly, to a technique for managing traffic in a multiport network node that is connected to another network node by a tunnel, for example, a stacked virtual local area network (VLAN) tunnel or a multiprotocol label switching (MPLS) tunnel.

BACKGROUND OF THE INVENTION

Traditional metropolitan area communications services are based upon technologies such as asynchronous transfer mode (ATM), synchronous optical network (SONET), and Frame Relay technologies, which are optimized for voice communications services. With the increased use of the Internet as a communications medium, non-voice traffic (often referred to as data traffic) is becoming the most prevalent type of network traffic. To meet the increasing demand for data-centric communications services in metropolitan areas, new data-centric metropolitan area networks (MANs) are being built. These new MANs often utilize Ethernet at Layer 2 of the Open System Interconnection (OSI) model to connect nodes within the network (where the OSI model is defined by the International Standardization Organization (ISO)). Ethernet is a popular Layer 2 protocol for use in MANs because of its compatibility with the installed base of end users, its compatibility with the widely used Layer 3 Internet protocol (IP), because of its overall flexibility, and because it is relatively cheap to deploy when compared to other Layer 2 technologies.

Although deploying Ethernet as the Layer 2 technology in MANs has many advantages, the end-user customers that are targeted to utilize MANs often desire advanced network services such as quality of service (QoS) guarantees, permanent virtual circuits (PVCs), Virtual Leased Lines (VLLs), and transparent LAN services (TLS). Many of these advanced services can be provided by a network that utilizes a Layer 2 technology such as ATM, SONET, or Frame Relay. Ethernet, on the other hand, was not originally designed to provide advanced services and as a result, solutions to customer needs can be more difficult to implement in Ethernet-based networks.

One Ethernet technology that is presently utilized in MANs to provide advanced services to customers is VLAN technology. A VLAN is a group of network devices on different physical LAN segments that communicate with each other as if they were on the same physical LAN segment. The goal of VLAN technology is to make two network devices appear as if they are on the same logical LAN even though they are on different physical LANS.

From the perspective of a particular network switch, a VLAN is a broadcast domain. The broadcast domain can be used for packets, belonging to the VLAN, which are broadcast packets or packets whose destination MAC address has not been learned. A packet that is broadcast within a broadcast domain is sent to all ports in the broadcast domain except the port on which the packet was received. Typically, VLANs are configured within a multiport network node (e.g., a Layer 2 switch) by associating a particular VLAN identifier (ID) with a set of ports. The set of ports defines the broadcast domain of the VLAN within the multiport network node.

FIG. 1A depicts an example of a network that utilizes VLAN technology to connect customers between two service provider network nodes (network node A 102 and network node B 104). In the example of FIG. 1, the two locations of customer $C_1$ communicate with each other on VLAN 100 and the two locations of customer $C_2$ communicate with each other on VLAN 200. With regard to network node A, the broadcast domain for VLAN 100 includes ports $P_1$ and $P_3$ and the broadcast domain for VLAN 200 includes ports $P_2$ and $P_3$. The broadcast domains for VLANs 100 and 200 at network node A are depicted in the VLAN table of FIG. 1B. In operation, a packet, which is a broadcast packet or a packet whose destination MAC address has not been learned, that is received at port $P_1$ of network node A from customer $C_1$ on VLAN 100 is broadcast to all ports in the VLAN except the port on which the packet was received. In this case, the packet is broadcast to port $P_3$. From port $P_3$, the packet is transmitted across the direct connection 106 to port $P_4$ of network node B. At port $P_4$ of network node B, a similar association is made for a broadcast packet or a packet whose destination MAC address has not been learned and the packet is broadcast to all ports in the broadcast domain except the port on which the packet was received. In this case, the packet is broadcast to port $P_5$, where the packet eventually reaches customer $C_1$. While FIG. 1A depicts a simplified network architecture in which the two service provider network nodes are directly connected, in many cases, service provider network nodes are separated by an intermediate network. For example, FIG. 2 depicts a network in which two service provider edge devices 202 and 204 are connected by an intermediate network 206 that may include multiple intermediate network nodes. Although traversing the intermediate network may involve multiple hops and many intermediate processing steps, the customers are only concerned that their traffic gets from one customer endpoint to the other. In particular, the customers want it to appear that their traffic is on one seamless LAN.

In order to provide VLAN services to customers that are connected by intermediate networks, service providers have employed "tunneling" technologies that essentially tunnel VLAN traffic through an intermediate network and deliver the VLAN traffic to a remote-end service provider edge device in the same form as it arrived at the near-end service provider edge device. FIG. 2 depicts an example transport tunnel 208 that exists between port $P_3$ of service provider edge device A and port $P_4$ of service provider edge device B. Because port $P_3$ is connected to an intermediate network, the port may also support multiple additional transport tunnels 210 that connect to other service provider edge devices or to the same service provider edge device.

While establishing broadcast domains to connect remote customers is fairly straight forward when service provider network nodes are directly connected, the task becomes more difficult when service provider edge devices are connected through an intermediate network using tunneling technologies. In particular, the mere assigning of ports to a VLAN does not ensure that the traffic will be sent in the correct "tunnel" to the desired remote-end service provider edge device. The difficulty of the task is further increased as the number of different customers, service provider nodes, VLANs, and tunnels grows.

In view of the desire for VLAN-based services, what is needed is a technique that enables flexible deployment of VLANs across service provider networks that employ tunneling techniques.

SUMMARY OF THE INVENTION

A technique for implementing VLANs across a service provider network involves establishing logical ports that have bindings to transport tunnels. The logical ports are then treated the same as physical ports in defining broadcast domains and forwarding traffic at particular service provider edge devices. Because the logical ports have bindings to transport tunnels, adding a particular logical port to a broadcast domain causes traffic from the respective VLAN to automatically be forwarded in the transport tunnel that is bound to the logical port. Logical ports enable a VLAN that spans an intermediate network to be established simply by adding the respective logical port to the broadcast domain of the VLAN.

Logical ports can be established for the transport of Layer 2 packets using stacked VLAN tunneling and MPLS tunneling. Establishing a logical port that uses stacked VLAN tunneling involves binding a physical port and a stacked VLAN tunnel to the logical port. Traffic that is forwarded to a stacked VLAN logical port is sent out of the service provider edge device from the physical port that is bound to the logical port and in the stacked VLAN tunnel that is bound to the logical port. Establishing a logical port that uses MPLS tunneling involves binding an MPLS tunnel to a logical port. In one embodiment, the logical port is bound to a static MPLS tunnel and in another embodiment, the logical port is bound to a dynamic MPLS tunnel and the destination IP address of the destination service provider edge device. Traffic that is forwarded to an MPLS logical port is sent out of the service provider edge device using the MPLS tunnel that is bound to the logical port.

Other aspects and advantages of the present invention will become apparent from the following detailed description, taken in conjunction with the accompanying drawings, illustrating by way of example the principles of the invention.

BREIF DESCRIPTION OF THE DRAWINGS

Throughout the description, similar reference numbers may be used to identify similar elements.

DETAILED DESCRIPTION OF THE INVENTION

Figures 1A, 1B:
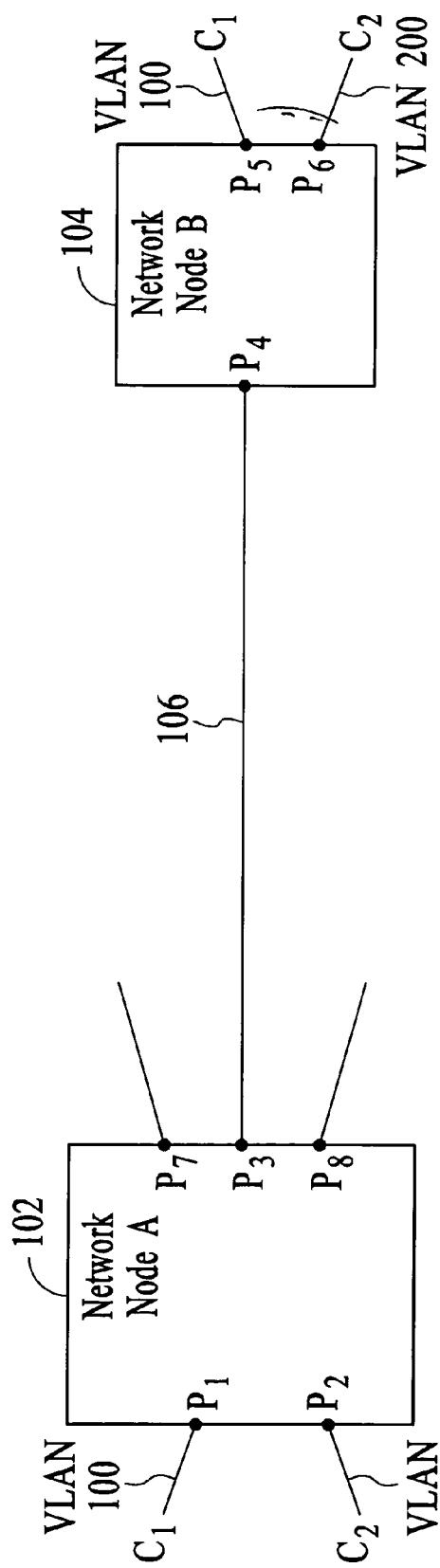
FIG. 1A depicts an example of a network that utilizes VLAN technology to connect two locations of customer $C_1$ on VLAN 100 and two locations of customer $C_2$ on VLAN 200.
FIG. 1B depicts the broadcast domains for VLANs 100 and 200 at network node A.
Figure 2:
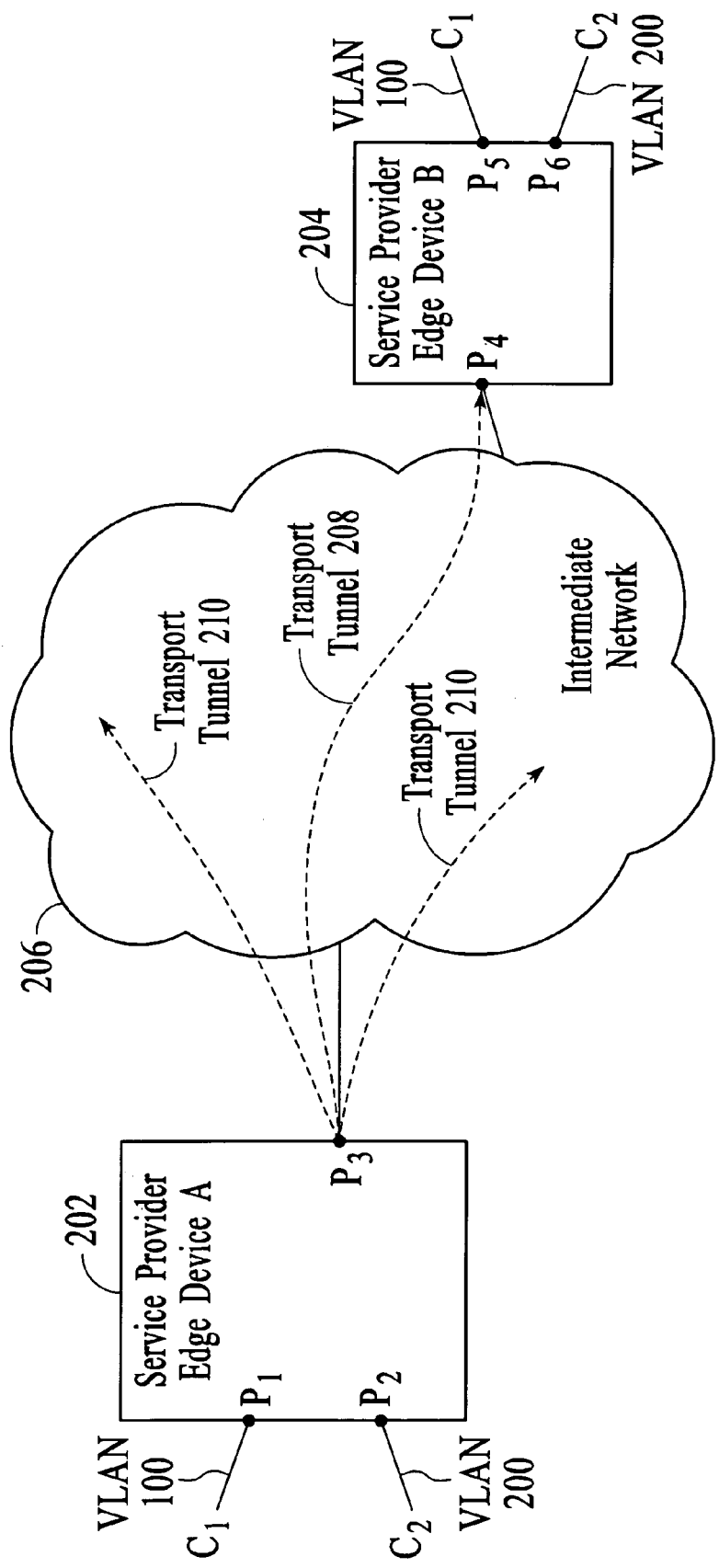
FIG. 2 depicts a network in which two service provider edge devices are connected by an intermediate network that may include multiple intermediate network nodes.
Figure 3:
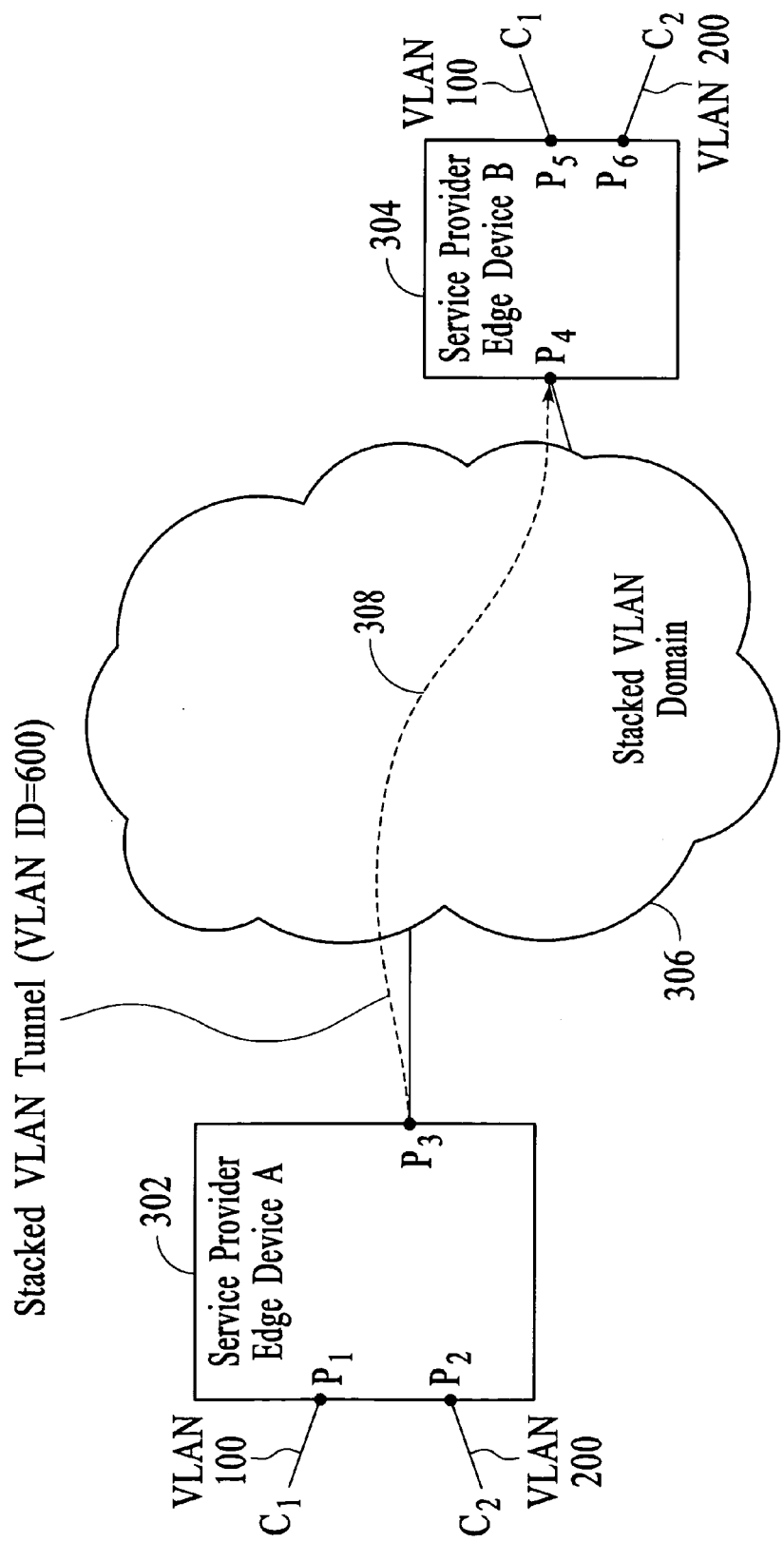
FIG. 3 depicts a network in which customer locations are connected via two service provider edge devices and an intermediate network by a stacked VLAN tunnel that exists between service provider edge devices (SPEDs) A and B.

FIG. 3 depicts a network in which customer locations are connected via two service provider edge devices 302 and 304 and an intermediate network 306. In the example, customer $C_1$ is connected to service provider edge device (SPED) A at port $P_1$ and to SPED B at port $P_5$. Customer $C_1$ wants to communicate between its two locations using VLAN 100. Customer $C_2$ is connected to SPED A at port $P_2$ and to SPED B at port $P_6$. Customer $C_2$ wants to communicate between its two locations using VLAN 200. In the example of FIG. 3, the intermediate network supports "stacked VLAN tunneling" and is referred to as a "stacked VLAN domain." In an embodiment, stacked VLAN tunneling involves encapsulating a first packet that is formatted according to the IEEE 802.1Q protocol (referred to herein as an "802.1Q packet") into a second 802.1Q packet. The header of the second 802.1Q packet (i.e., the outer packet header) is used to forward the packet through the stacked VLAN domain and is removed at the far-end SPED. Removing the header of the second 802.1Q packet at the far-end SPED leaves the first 802.1Q packet (i.e., the original 802.1Q packet). The first 802.1Q packet is then handled at the far-end SPED like other VLAN packets and is forwarded to all ports in the respective broadcast domain.

FIG. 3 also depicts a stacked VLAN tunnel 308 that exists between SPEDs A and B. The stacked VLAN tunnel is identified with a VLAN ID of 600. In the example of FIG. 3, packets that use stacked VLAN tunnel 600 to travel between SPEDs A and B are encapsulated with an 802.1Q header having a VLAN ID of 600.

Using conventional VLAN techniques, the broadcast domain for VLAN 100 at SPED A can be configured by adding physical ports $P_1$ and $P_3$ to the broadcast domain. Traffic arriving at SPED A on VLAN 100 is forwarded to at least one of the ports in the broadcast domain (except the port on which the traffic arrived) depending on whether the traffic is broadcast traffic, traffic for which the destination MAC address has not yet been learned, or learned traffic. A problem with this approach is that simply forwarding VLAN 100 traffic to physical port $P_3$ does not ensure that the VLAN 100 traffic will be sent out in the target stacked VLAN tunnel (e.g., stacked VLAN tunnel 600). In order for the VLAN 100 traffic to be sent out on the target stacked VLAN tunnel, there must be some relationship configured between VLAN 100, physical port $P_3$, and the target stacked VLAN tunnel.

In accordance with an embodiment of the invention, a logical port is created at SPED A that includes a binding to a physical port and to a target stacked VLAN tunnel. The logical port can then be used in defining the broadcast domain of a VLAN and forwarding traffic. In the embodiment of FIG. 3, a logical port is created by binding physical port $P_3$ and stacked VLAN tunnel 600 to the logical port. In the example, the logical port is identified by the notation "$LP_{3,600}$," where the first subscript number '3' identifies the physical port to which the logical port is bound and where the second subscript number '600' represents the stacked VLAN tunnel to which the logical port is bound.

In an embodiment, the process of binding a physical port and a stacked VLAN tunnel to a logical port involves allocating a table entry in an exit port table for the logical port. The table entry maps the logical port to the physical port of exit and to the VLAN ID of the outer IEEE 802.1Q header.

Figures 4A, 4B:
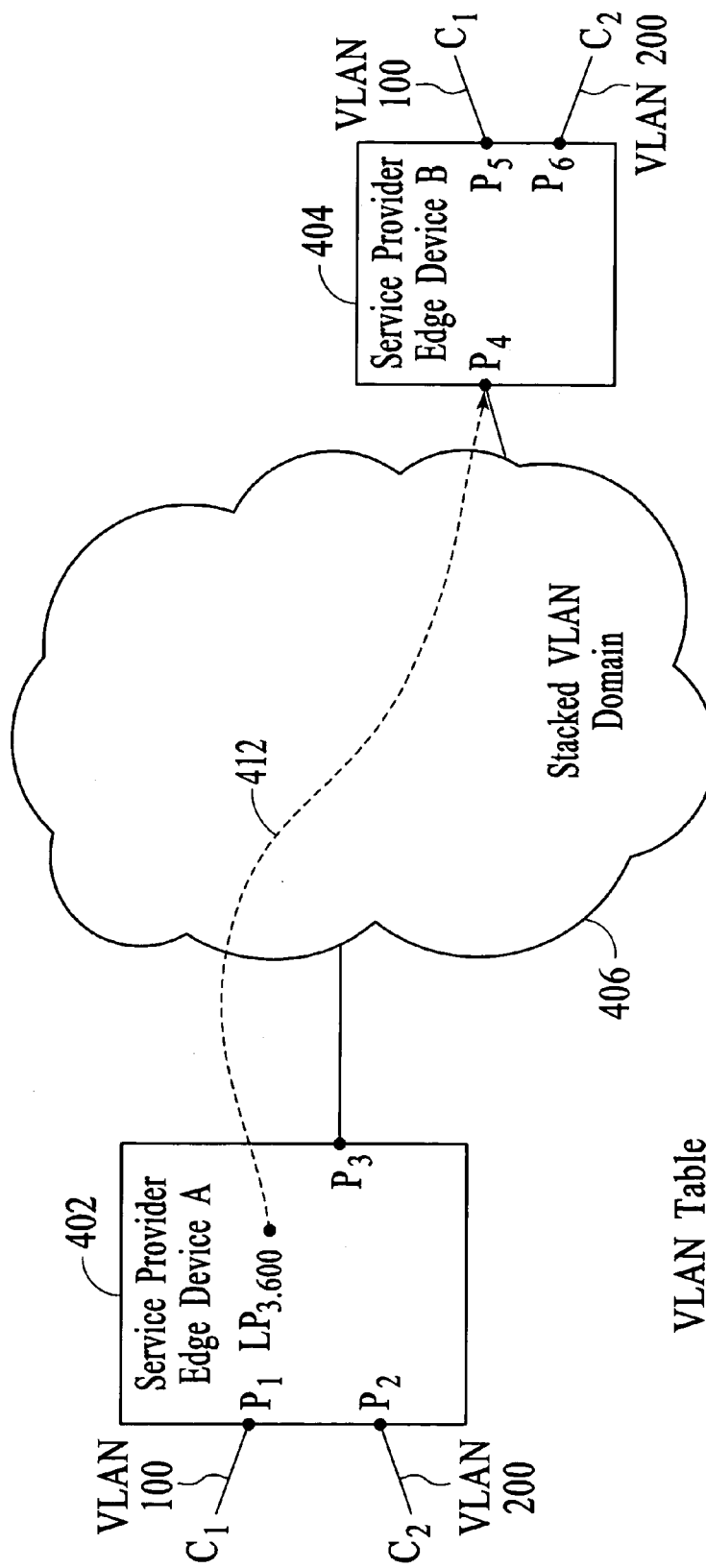
FIG. 4A depicts the logical relationship between logical port $LP_{3.600}$, SPED A, and SPED B in accordance with an embodiment of the invention.
FIG. 4B depicts the broadcast domains for VLANs 100 and 200 at SPED A using logical ports in accordance with an embodiment of the invention.

FIG. 4A depicts the logical relationship between logical port $LP_{3,600}$, SPED A 402, and SPED B 404. In particular, FIG. 4A depicts that logical port $LP_{3,600}$ connects SPED A to port $P_4$ of SPED B via logical path 412. With logical port $LP_{3,600}$ established, a broadcast domain that connects SPED A and SPED B can be created by adding logical port $LP_{3,600}$ to the desired VLAN. For example, VLAN 100 at SPED A can be connected to SPED B by defining the broadcast domain for VLAN 100 at SPED A as including ports $P_1$ and $LP_{3,600}$, where port $P_1$ is a physical port and port $LP_{3,600}$ is a logical port. Likewise, VLAN 200 at SPED A can be connected to SPED B by defining the broadcast domain for VLAN 200 at SPED A as including ports $P_2$ and $LP_{3,600}$, where port $P_2$ is a physical port and port $LP_{3,600}$ is a logical port. The broadcast domains for VLANs 100 and 200 at SPED A are depicted in the VLAN table of FIG. 4B. Because the logical port $LP_{3,600}$ includes an inherent connection to the stacked VLAN tunnel that connects SPED A and SPED B, configuring a VLAN that spans SPEDs A and B can be accomplished simply by adding logical port $LP_{3,600}$ to the VLAN. In addition, any new VLANs that need to span SPED A and SPED B can be created at SPED A by simply adding logical port $LP_{3,600}$ to the respective broadcast domain. In sum, because of the logical port's binding to the physical port and to the stacked VLAN tunnel, the logical port can be used just like any physical port to implement VLANs and forwarding traffic. The logical port can also be treated the same as a physical port for other operations, such as filtering, spanning tree protocol (STP), and link aggregation groups (LAGs).

In an example operation, a packet is received from customer $C_1$ at port $P_1$ of SPED A 402. The received packet is identified as belonging to VLAN 100 and the broadcast domain for VLAN 100 is identified. As depicted in FIG. 4B, the broadcast domain for VLAN 100 includes ports $P_1$ and $LP_{3,600}$. In the case of a broadcast packet or a packet whose destination MAC address has not been learned, the packet is broadcast to all ports in the broadcast domain except the port on which the packet was received and since the packet is received on port $P_1$, the packet is broadcast to port $LP_{3,600}$. After the destination MAC address has been learned, the packet can be forwarded using the logical port. The packet is forwarded out of SPED A using logical port $LP_{3,600}$. In an embodiment, using logical port $LP_{3,600}$ to forward the packet out of the SPED involves searching an exit port table for a match to the logical port. The result of the exit port table lookup is the physical port to which the packet should be forwarded and the VLAN ID for the stacked VLAN tunnel in which the packet is to be forwarded.

Figure 5:
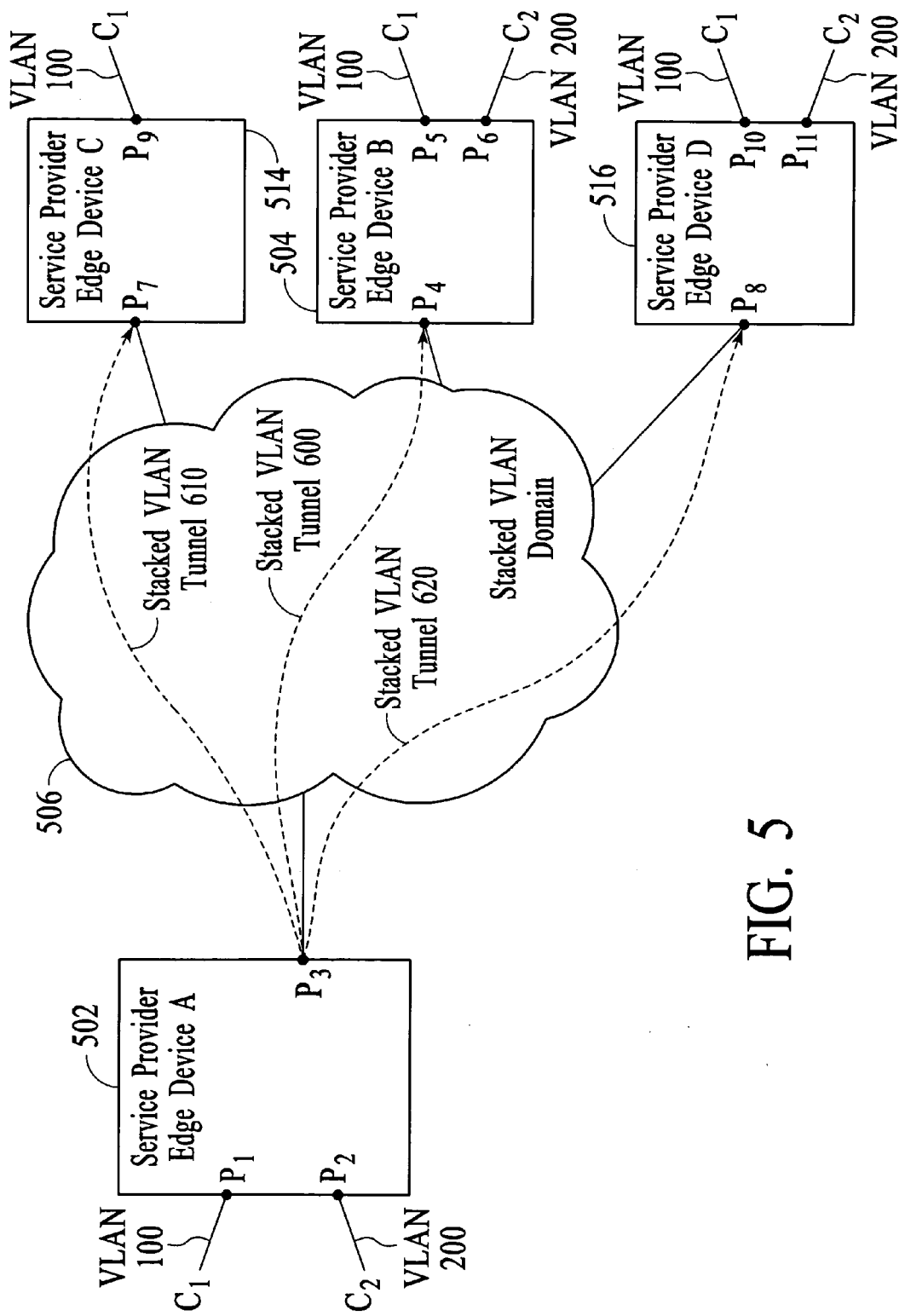
FIG. 5 depicts an example network in which stacked VLAN tunnels connect port $P_3$ of SPED A to SPEDs B, C, and D.

Multiple stacked VLAN tunnels often emanate from the same port of a SPED in order to connect the SPED to multiple other SPEDs through an intermediate network. FIG. 5 depicts an example network in which stacked VLAN tunnels connect port $P_3$ of SPED A 502 to SPEDs B, C, and D 504, 514, and 516, respectively. In the example, stacked VLAN tunnel 600 connects SPED A to SPED B, stacked VLAN tunnel 610 connects SPED A to SPED C, and stacked VLAN tunnel 620 connects SPED A to SPED D. Also in the example, one customer $C_1$ location is connected to port $P_9$ of SPED C and another customer $C_1$ location is connected to port $P_{10}$ of SPED D. Additionally, a customer $C_2$ location is connected to port $P_{11}$ of SPED D. In order to create broadcast domains between the various SPEDs using logical ports as described above, separate logical ports can be established that connect SPED A to SPEDs B, C, and D, respectively. In an embodiment, one logical port is established for each connection by binding the logical port to the corresponding physical port and to the respective stacked VLAN tunnel. For example, logical port $LP_{3,600}$ is bound to physical port $P_3$ and stacked VLAN tunnel 600 as described above, logical port $LP_{3,610}$ is bound to physical port $P_3$ and stacked VLAN tunnel 610, and logical port $LP_{3,620}$ is bound to physical port $P_3$ and stacked VLAN tunnel 620.

Figures 6A, 6B:
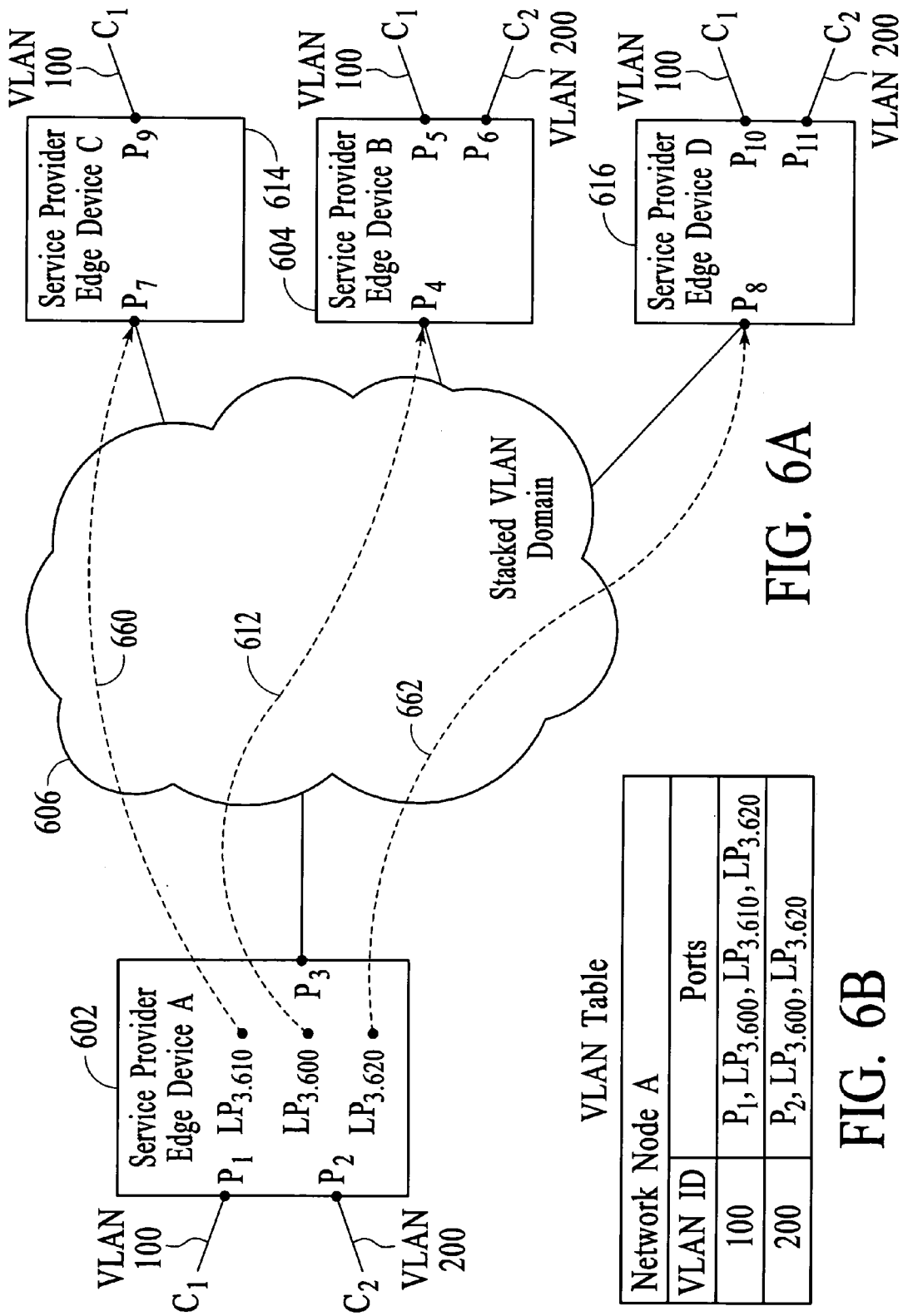
FIG. 6A depicts the logical relationship between logical port $LP_{3.600}$, logical port $LP_{3.610}$, logical port $LP_{3.620}$, and SPEDs A through D in accordance with an embodiment of the invention.
FIG. 6B depicts the broadcast domains for VLANs 100 and 200 at SPED A using logical ports in accordance with an embodiment of the invention.

FIG. 6A depicts the logical relationship between logical port $LP_{3,600}$, logical port $LP_{3,610}$, logical port $LP_{3,620}$, and SPEDs A through D. In particular, FIG. 6A depicts that logical port $LP_{3,600}$ connects SPED A to SPED B via logical path 612, logical port $LP_{3,610}$ connects SPED A to SPED C via logical path 660, and logical port $LP_{3,620}$ connects SPED A to SPED D via logical path 662. With the three logical ports established, a broadcast domain at SPED A for VLAN 100 can be created by simply adding physical port $P_1$ and logical ports $LP_{3,600}$, $LP_{3,610}$, and $LP_{3,620}$ to VLAN 100. The broadcast domain will enable VLAN 100 traffic at SPED A to connect to SPEDs B, C, and D. Likewise, a broadcast domain at SPED A for VLAN 200 can be created by simply adding physical ports $P_2$ and logical ports $LP_{3,600}$, and $LP_{3,620}$ to VLAN 200. The broadcast domain for VLAN 200 does not include logical port $LP_{3,610}$ because in the example of FIG. 6A customer $C_2$ does not have a location connected to SPED C. The broadcast domains for VLANs 100 and 200 at SPED A are depicted in the VLAN table of FIG. 6B. Packets are forwarded through the SPED using the logical ports as described above with reference to FIGS. 4A and 4B.

Another technique that is used to tunnel traffic through an intermediate network involves the use of multiprotocol label switching (MPLS). Using MPLS, incoming packets are assigned a "label" by a "label edge router." Packets are forwarded along a "label switch path" (LSP) through a series of connected "label switch routers." Each label switch router makes forwarding decisions based on the contents of the label. At each hop, the label switch routers strip off the existing label and apply a new label that tells the next hop how to forward the packet. LSPs are provisioned using Resource Reservation protocol (RSVP) and Label Distribution protocol (LDP). LSPs can be established by network operators for a variety of purposes, such as to guarantee a certain level of performance, to route around network congestion, or to create tunnels for virtual private networks. MPLS can be used to create end-to-end circuits, with specific performance characteristics, across any type of transport medium.

Figure 7:
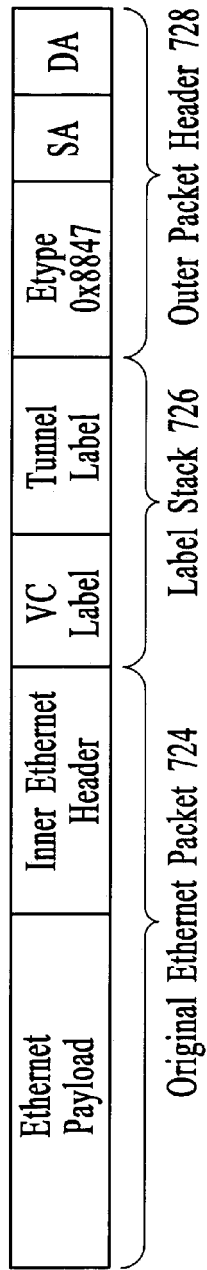
FIG. 7 depicts an example packet that is used for Layer 2 MPLS tunneling.

In an embodiment of MPLS tunneling, a customer's traffic (e.g., an Ethernet packet) is switched or routed to a SPED, which serves the function of an MPLS label edge router. The SPED determines the VLAN to which the packet belongs, either by looking at the 802.1Q header or by determining the VLAN associated with the incoming port. The Ethernet packet is then mapped to a user-defined Forwarding Equivalence Class (FEC), which defines how the packet gets forwarded. An FEC lookup yields the outgoing physical port and two MPLS labels. The first MPLS label is placed at the top of the label stack and is referred to as the "tunnel label." The tunnel label is used to carry the frame across the intermediate network. The second label is placed at the bottom of the label stack and is referred to as the "VC label." The VC label is used by the egress label edge router (i.e., the SPED at which the packet exits the MPLS domain) to determine how to process the packet. After adding two MPLS headers (one for each MPLS label), the packet is encapsulated into the format that corresponds to the outgoing interface. FIG. 7 depicts an example packet that is used for Layer 2 MPLS tunneling through an Ethernet-based intermediate network. The packet includes an original Ethernet packet 724, an MPLS label stack 726 (including the tunnel and VC labels), and an outer packet header 728 (e.g., an Ethernet header). A description of a type of Layer 2 MPLS tunneling is found in the Internet Engineering Task Force (IETF) documents draft-martini-12circuit-trans-mpls-09 and draft-martini-12circuit-encap-mpls-04, which are incorporated by reference herein.

Figure 8:
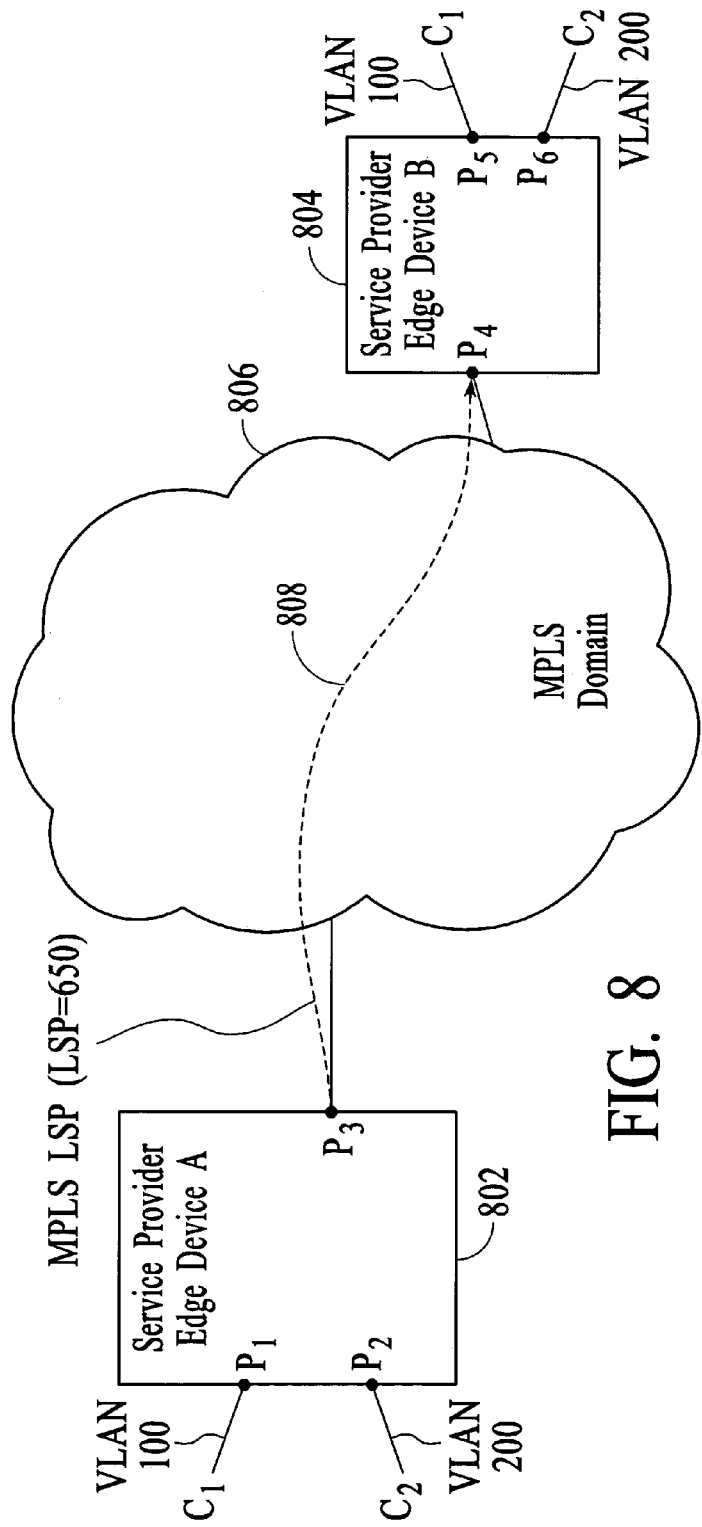
FIG. 8 depicts a network in which customer locations are connected via two SPEDs and an intermediate network by an MPLS tunnel that exists between SPEDs A and B.

FIG. 8 depicts a network in which customer locations are connected via two SPEDs 802 and 804 and an intermediate network 806. The network of FIG. 8 is similar to the network of FIG. 3 except that the intermediate network supports MPLS tunneling and is referred to as an "MPLS domain." In the example of FIG. 8, an MPLS tunnel 808 is implemented at Layer 2 using a static LSP that connects physical port $P_3$ of SPED A to physical port $P_4$ of SPED B. Tunneling using a static LSP involves specifying the particular LSP that is to be used to connect the two SPEDs. In an embodiment, a static LSP is specified by indicating the tunnel label that is to be appended to the tunneled packet. For description purposes, the static LSP is identified as "LSP 650," which indicates that tunnel label 650 is to be appended to the tunneled packet. The static LSP is a uni-directional entity that runs from SPED A to SPED B.

As with the stacked VLAN embodiment, using conventional VLAN techniques, a broadcast domain for VLAN 100 at SPED A can be configured by adding physical ports $P_1$ and $P_3$ to the broadcast domain. Traffic arriving at SPED A on VLAN 100 is forwarded to at least one of the ports in the broadcast domain (except the port on which the traffic arrived) depending on whether the traffic is broadcast traffic, traffic for which the destination MAC address has not yet been learned, or learned traffic. A problem with this approach is that simply forwarding VLAN 100 traffic to physical port $P_3$ does not ensure that the VLAN 100 traffic will be sent out in the target MPLS tunnel (e.g., using LSP 650). In order for the VLAN 100 traffic to be sent out on the target MPLS tunnel, there must be some relationship configured between VLAN 100 and the target MPLS tunnel.

In accordance with an embodiment of the invention, a logical port is created which includes a binding to the target MPLS tunnel. The logical port can then be used in defining the broadcast domain of a VLAN. In the example of FIG. 8, a logical port is created by binding the logical port to static MPLS tunnel 650. The example logical port is identified as "$LP_{MPLS.650}$". In an embodiment, the binding process involves specifying the logical port's name and indicating the tunnel label that is to be appended to the tunneled packet. In an embodiment, the process of binding an MPLS tunnel to a logical port involves allocating a table entry in an exit port table to the logical port. The table entry maps the logical port to the MPLS tunnel. A subsequent MPLS tunnel lookup maps the MPLS tunnel to a physical port and an LSP. In this example, the logical port's name identifies the static MPLS tunnel that is used to tunnel the packet. Creating the logical port may also include binding the logical port to a VC ID. The VC ID is used for the VC label during MPLS tunneling. In an embodiment, the VC label is allocated from the range of 4,096-65,535, both numbers inclusive. The VC label is the label on which the far-end SPED (which acts as the egress label edge router) will receive the packet. The VC label may also be referred to as the "receive label." The VC label may be used by the far-end SPED to identify the VLAN to which a packet belongs and to make further forwarding decisions. The above-identified range of values for the VC label is selected so that hardware can be programmed to easily distinguish between stacked VLAN tunnels and MPLS tunnels.

Figures 9A, 9B:
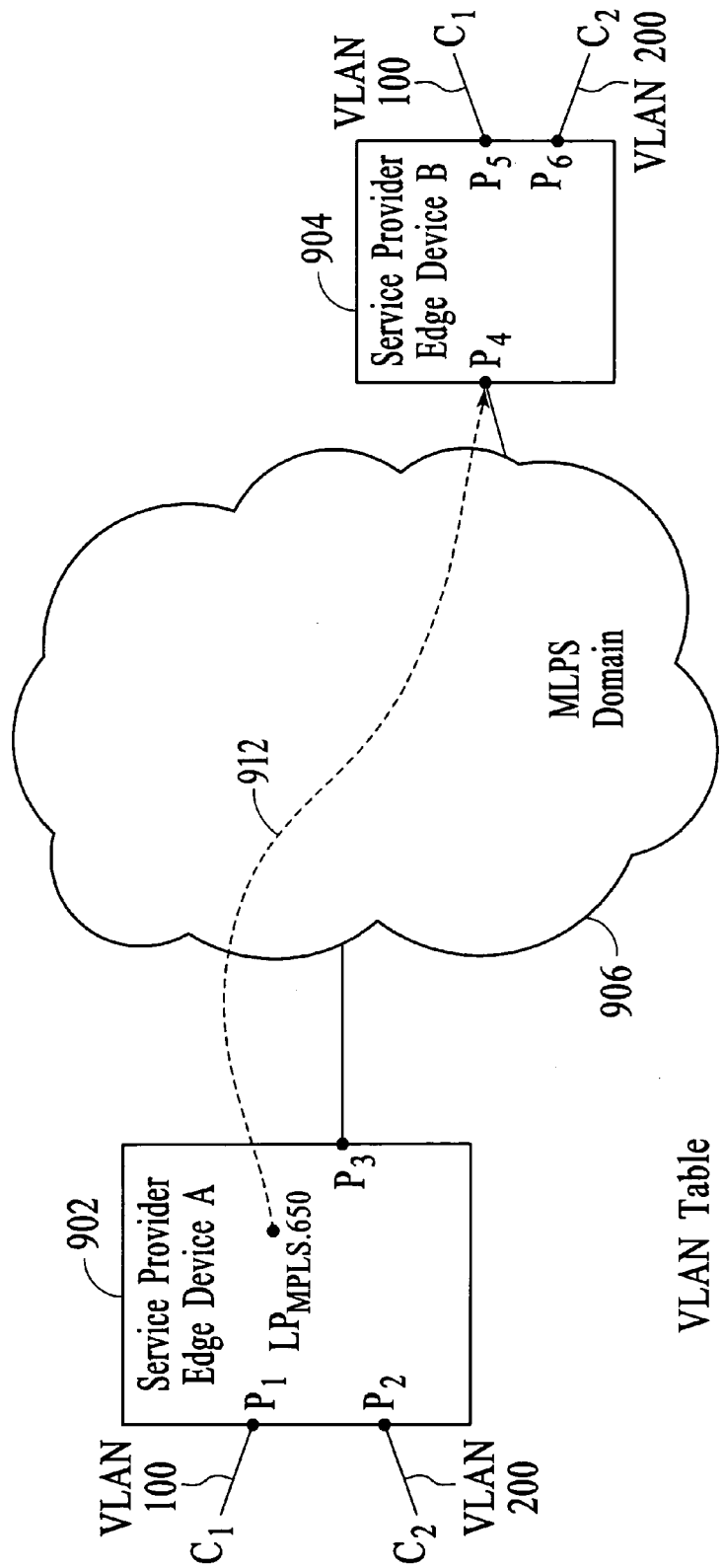
FIG. 9A depicts the logical relationship between logical port $LP_{MPLS.650}$, SPED A, and SPED B in accordance with an embodiment of the invention.
FIG. 9B depicts the broadcast domains for VLANs 100 and 200 at SPED A using logical ports in accordance with an embodiment of the invention.

FIG. 9A depicts the logical relationship between logical port $LP_{MPLS.650}$, SPED A 902, and SPED B 904. In particular, FIG. 9A depicts that logical port $LP_{MPLS.650}$ connects SPED A with port $P_4$ of SPED B via logical path 912. With logical port $LP_{MPLS.650}$ established, a broadcast domain that connects customer $C_1$ at SPED A with SPED B can be created by adding physical port $P_1$ and logical port $LP_{MPLS.650}$ to the broadcast domain for VLAN 100. Likewise, a broadcast domain that connects customer $C_2$ at SPED A with SPED B can be created by adding physical port $P_2$ and $LP_{MPLS.650}$ to the broadcast domain for VLAN 200. The broadcast domains for VLANs 100 and 200 at service provider edge device A are depicted in the VLAN table of FIG. 9B.

In an example operation, a packet is received from customer $C_1$ at port $P_1$ of SPED A 902. The received packet is identified as belonging to VLAN 100 and the broadcast domain for VLAN 100 is identified. As depicted in FIG. 9B, the broadcast domain for VLAN 100 includes ports $P_1$ and $LP_{MPLS.650}$. In the case of a broadcast packet or a packet whose destination MAC has not yet been learned, the packet is broadcast to all ports in the broadcast domain except the port on which the packet was received and since the packet is received on port $P_1$, the packet is broadcast to port $LP_{MPLS.650}$. The packet is forwarded out of the SPED using logical port $LP_{MPLS.650}$. After the destination MAC address has been learned, the packet can be forwarded using the logical port. In an embodiment, using logical port $LP_{MPLS.650}$ to forward the packet out of the SPED involves searching an exit port table for a match to the logical port. The result of the exit port table lookup is the MPLS tunnel in which the packet should be forwarded. In this case, the packet is forwarded on LSP 650. The packet is forwarded, as described above, with two MPLS labels. The outer MPLS label being the tunnel label and the inner label being the VC label.

Figure 10:
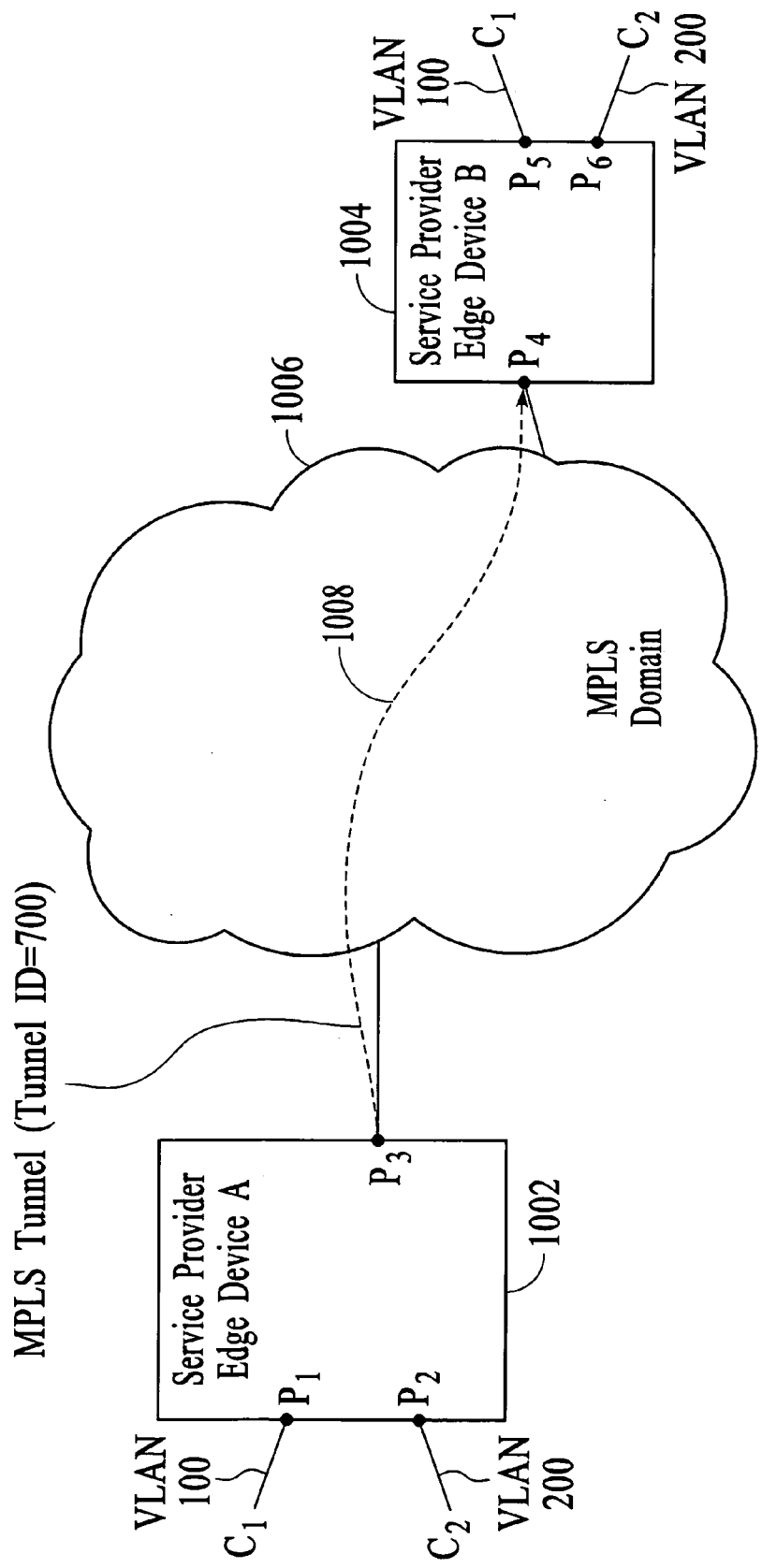
FIG. 10 depicts an example of a dynamic MPLS tunnel that connects physical port $P_3$ of SPED A to physical port $P_4$ of SPED B.

MPLS tunneling can also be implemented using dynamic MPLS tunnels. Dynamic MPLS tunnels are MPLS tunnels that do not specify a particular LSP that must be used to reach the target destination. Using a dynamic MPLS tunnel, the particular LSP that is utilized may change from time to time in response to factors such as traffic load and latency. FIG. 10 depicts an example of a dynamic MPLS tunnel 1008 (identified as MPLS tunnel 700) that connects physical port $P_3$ of SPED A 1002 to physical port $P_4$ of SPED B 1004.

In accordance with an embodiment of the invention, a logical port is created which includes a binding to the target MPLS tunnel and to the target destination. The logical port can then be used in defining the broadcast domain of a VLAN. In the example of FIG. 10, a logical port, identified as "$LP_{MPLS.5000}$", is bound to MPLS tunnel 700 and to the destination IP address of SPED B. The subscript number '5000' is a number that is selected by SPED A to identify the logical port. In an embodiment, the binding process involves specifying the MPLS tunnel and the destination IP address of the destination SPED (which also acts as the egress label edge router). In operation, the MPLS tunnel ID is used to identify the actual LSP on which a packet travels. Likewise, the LSP on which the packet travels may be mapped to a physical port of the SPED (which acts as the ingress label edge router). The actual LSP that corresponds to the MPLS tunnel is dynamically determined by an LDP. In an embodiment, the logical port includes a binding to the VC ID that is to be used for the VC label. The VC label may be allocated from the range of 4,096-65,535, both numbers inclusive. This is the label on which the far-end SPED (which acts as the egress label edge router) will receive the packet. This label may also be referred to as the "receive label." The above-identified range of values for the VC label is selected so that hardware can be programmed to easily distinguish between stacked VLAN tunnels and MPLS tunnels.

Figures 11A, 11B:
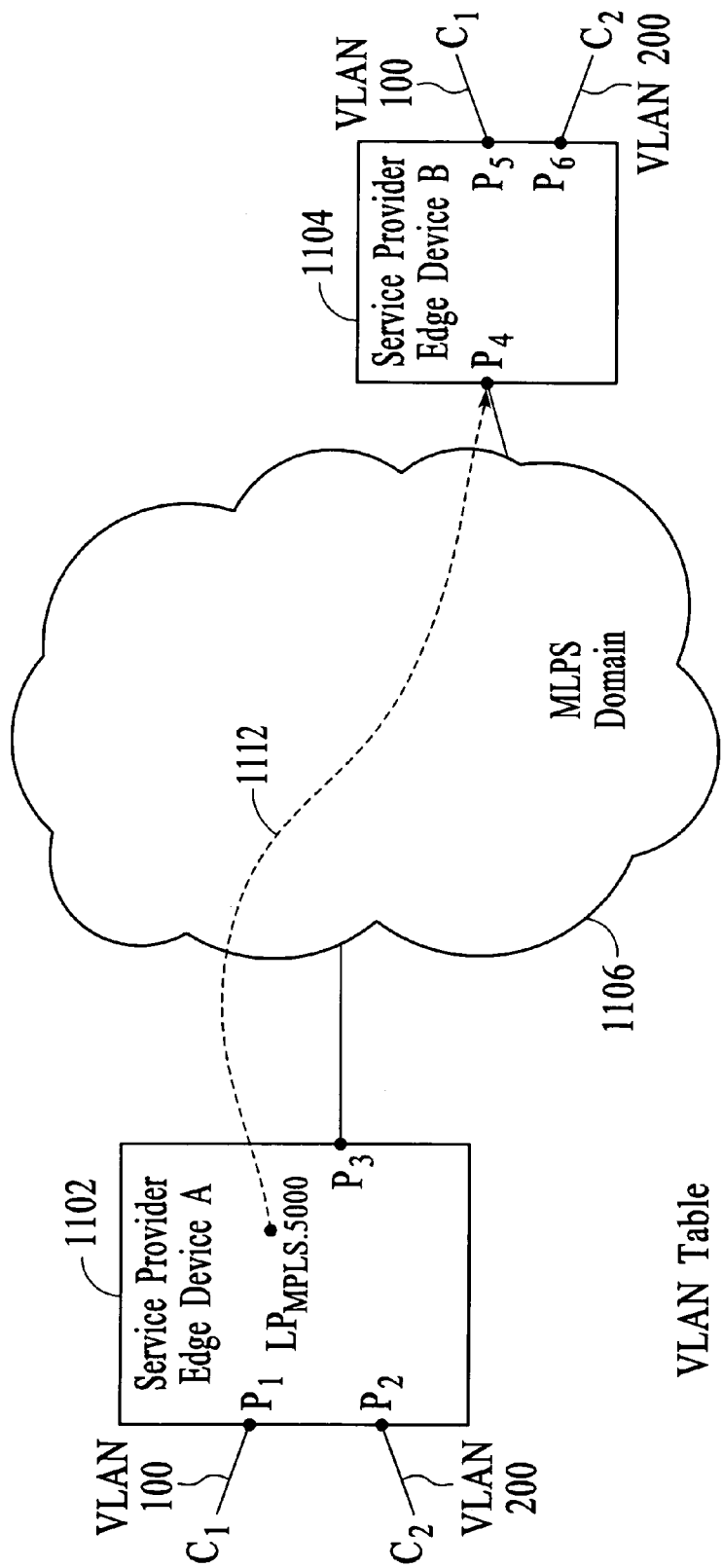
FIG. 11A depicts the logical relationship between logical port $LP_{MPLS.5000}$, SPED A, and SPED B in accordance with an embodiment of the invention.
FIG. 11B depicts the broadcast domains for VLANs 100 and 200 at SPED A using logical ports in accordance with an embodiment of the invention.

FIG. 11A depicts the logical relationship between logical port $LP_{MPLS.5000}$, SPED A 1102, and SPED B 1104. In particular, FIG. 11A depicts that logical port $LP_{MPLS.5000}$ connects SPED A with port $P_4$ of SPED B via logical path 1112. With logical port $LP_{MPLS.5000}$ established, a broadcast domain that connects customer $C_1$ at SPED A with SPED B can be created by adding physical port $P_1$ and logical port $LP_{MPLS.5000}$ to the broadcast domain for VLAN 100. Likewise, a broadcast domain that connects customer $C_2$ at SPED A with SPED B can be created by adding physical port $P_2$ and $LP_{MPLS.5000}$ to the broadcast domain for VLAN 200. The broadcast domains for VLANs 100 and 200 at service provider edge device A are depicted in the VLAN table of FIG. 11B.

In an example operation, a packet is received from customer $C_1$ at port $P_1$ of SPED A 1102. The received packet is identified as belonging to VLAN 100 and the broadcast domain for VLAN 100 is identified. As depicted in FIG. 11B, the broadcast domain for VLAN 100 includes ports $P_1$ and $LP_{MPLS.5000}$. In the case of a broadcast packet or a packet whose destination MAC address has not been learned, the packet is broadcast to all ports in the broadcast domain except the port on which the packet was received and since the packet is received on port $P_1$, the packet is broadcast to port $LP_{MPLS.5000}$. The packet is forwarded out of SPED A using logical port $LP_{MPLS.5000}$. In an embodiment, using logical port $LP_{MPLS.5000}$ to forward the packet out of the SPED involves searching an exit port table for a match to the logical port. The result of the exit port table lookup is the MPLS tunnel in which the packet should be forwarded. In this case, the MPLS tunnel (e.g., tunnel 700) is further used to identify the particular LSP on which the packet is forwarded. The packet is forwarded, as described above with reference to FIG. 8, with two MPLS labels. The outer MPLS label being the tunnel label, which is used to forward the packet through the MPLS domain, and the inner label being the VC label, which is used by the far-end SPED (which acts as the egress label edge router) to determine how to forward the packet.

Figures 12A, 12B:
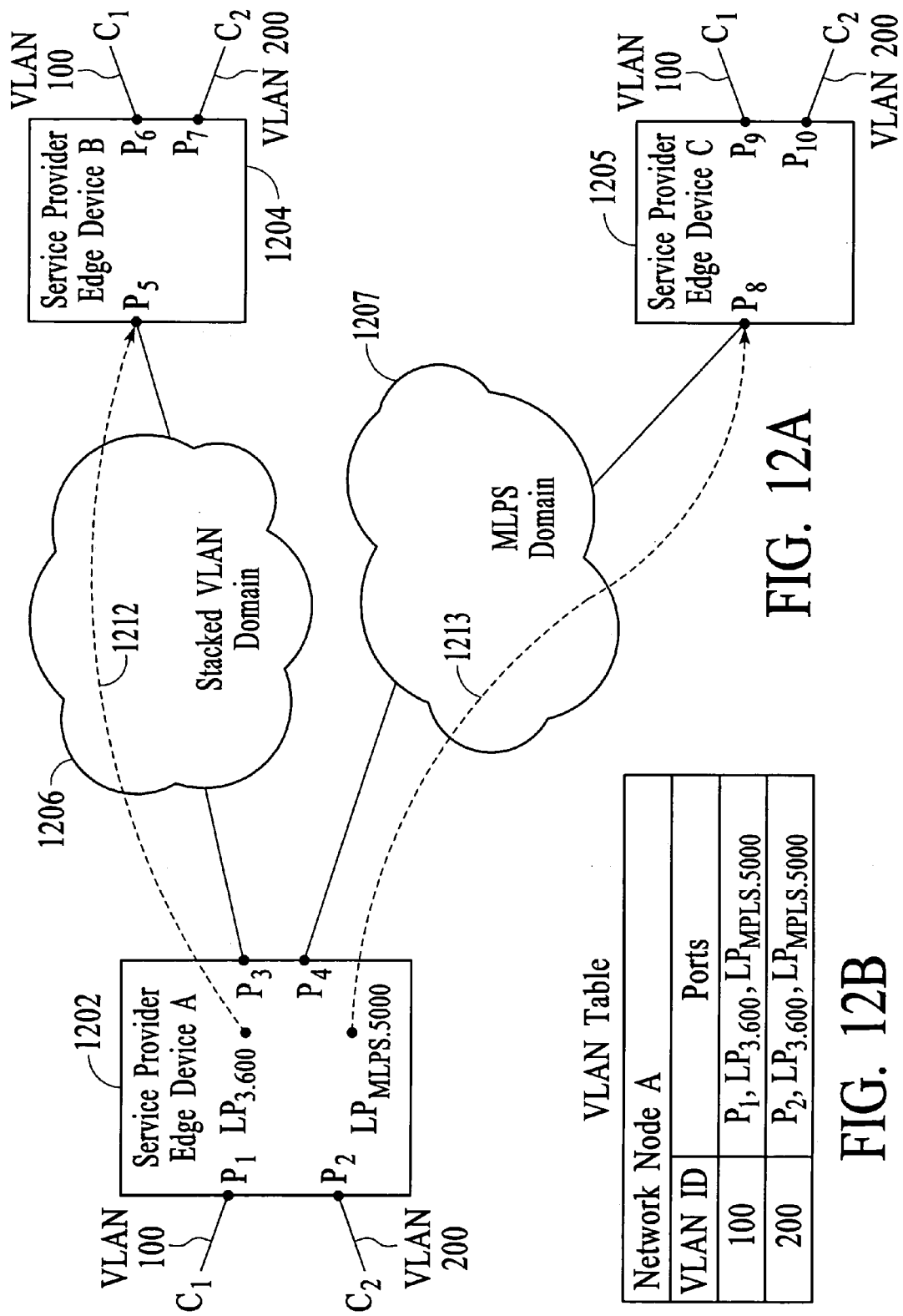
FIG. 12A depicts the logical relationship between logical port $LP_{3.600}$, logical port $LP_{MPLS.5000}$, and SPEDs A through C in accordance with an embodiment of the invention.
FIG. 12B depicts the broadcast domains for VLANs 100 and 200 at SPED A using logical ports in accordance with an embodiment of the invention.

In FIGS. 3-11B, the broadcast domains are described as including either a logical port that is bound to a stacked VLAN tunnel or a logical port that is bound to an MPLS tunnel. However, it is possible that the same broadcast domain could include a logical port that is bound to a stacked VLAN tunnel and a logical port that is bound to an MPLS tunnel. FIG. 12A depicts an example of a network where SPED A 1202 is connected to SPED B 1204 by a stacked VLAN domain 1206 and to SPED C 1205 by an MPLS domain 1207. In particular, port $P_3$ of SPED A is connected to port $P_5$ of SPED B via the stacked VLAN domain and port $P_4$ of SPED A is connected to port $P_8$ of SPED C via the MPLS domain. At SPED A, two logical ports have been created. The first logical port, $LP_{3.600}$, is bound to physical port $P_3$ and stacked VLAN tunnel 600 (not shown). The logical port is similar to the logical port that is described above with reference to FIGS. 3-4B. The second logical port, $LP_{MPLS.5000}$, is bound to an MPLS tunnel (not shown). The logical port is similar to the logical port that is described above with reference to FIGS. 10-11B. The logical ports can be used in defining the broadcast domain of a VLAN in the same manner that is described above. FIG. 12A depicts the logical relationship between logical port $LP_{3.600}$, logical port $LP_{MPLS.5000}$, and SPEDs A through C. In particular, FIG. 12A depicts that logical port $LP_{3.600}$ connects SPED A with port $P_5$ of SPED B via logical path 1212 and that logical port $LP_{MPLS.5000}$ connects SPED A with port $P_8$ of SPED C via logical path 1213. At SPED A, a broadcast domain that connects to customer $C_1$ locations at SPEDs B and C can be created simply by adding physical port $P_1$, logical port $LP_{3.600}$, and logical port $LP_{MPLS.5000}$ to the broadcast domain for VLAN 100. Likewise, a broadcast domain that connects customer $C_2$ locations at SPEDs B and C can be created simply by adding physical port $P_2$, logical port $LP_{3.600}$, and logical port $LP_{MPLS.5000}$ to the broadcast domain for VLAN 200. The broadcast domains for VLANs 100 and 200 at SPED A are depicted in the VLAN table of FIG. 12B.

Although the stacked VLAN and MPLS domains are depicted as separate networks, the stacked VLAN and MPLS domains may be implemented totally, or partially, on common network devices.

Although stacked VLAN tunnels and MPLS tunnels have been described, other transport tunnels could be bound to a logical port. Additionally, although the VLAN process is described in a single direction, the same processes could be implemented at the far-end SPEDs to achieve bidirectional functionality.

Figure 13:
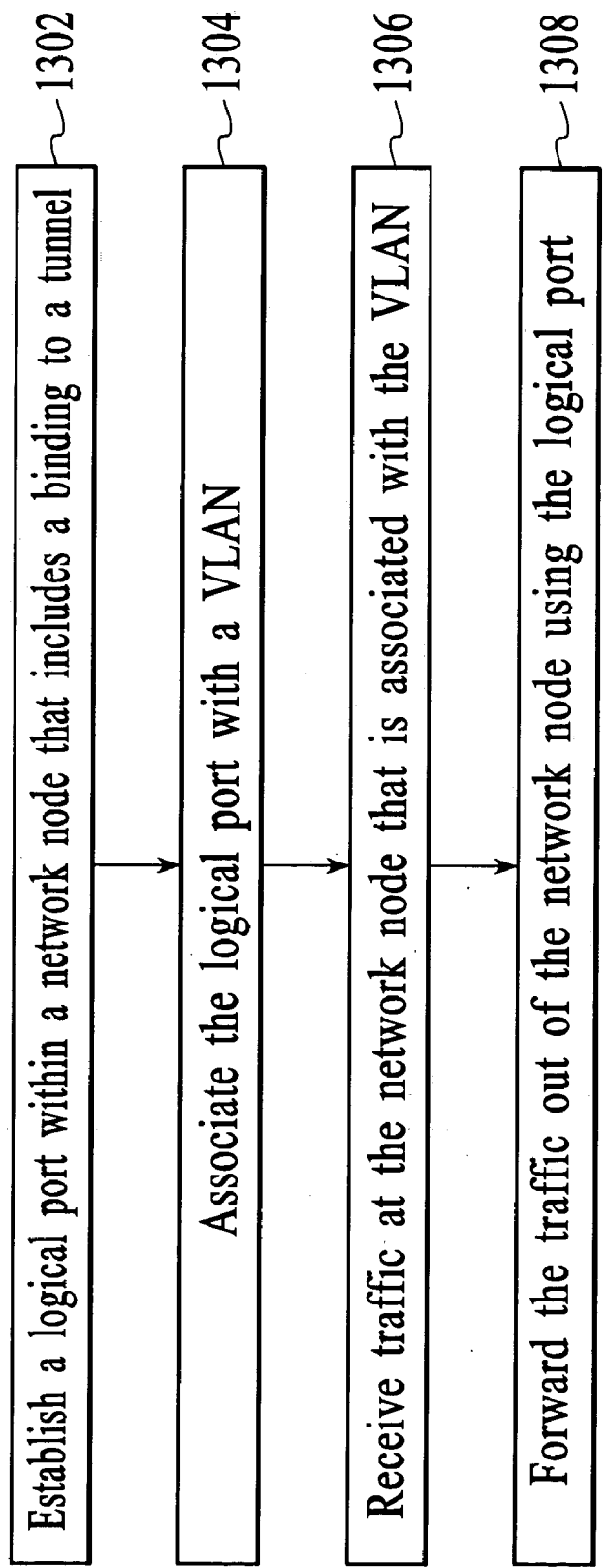
FIG. 13 depicts a process flow diagram of a method for managing VLAN traffic in a network node in accordance with an embodiment of the invention.

FIG. 13 depicts a process flow diagram of a method for managing VLAN traffic in a network node. According to the method, at step 1302, a logical port is established within a network node that includes a binding to a tunnel. In an embodiment, establishing the logical port includes binding the logical port to a physical port of the network node and a stacked VLAN tunnel. In another embodiment, establishing the logical port includes binding the logical port to an MPLS tunnel. At step, 1304, the logical port is associated with a VLAN. At step 1306, traffic that is associated with the VLAN is received at the network node. At step 1308, the traffic is forwarded out of the network node using the logical port.

Figure 14:
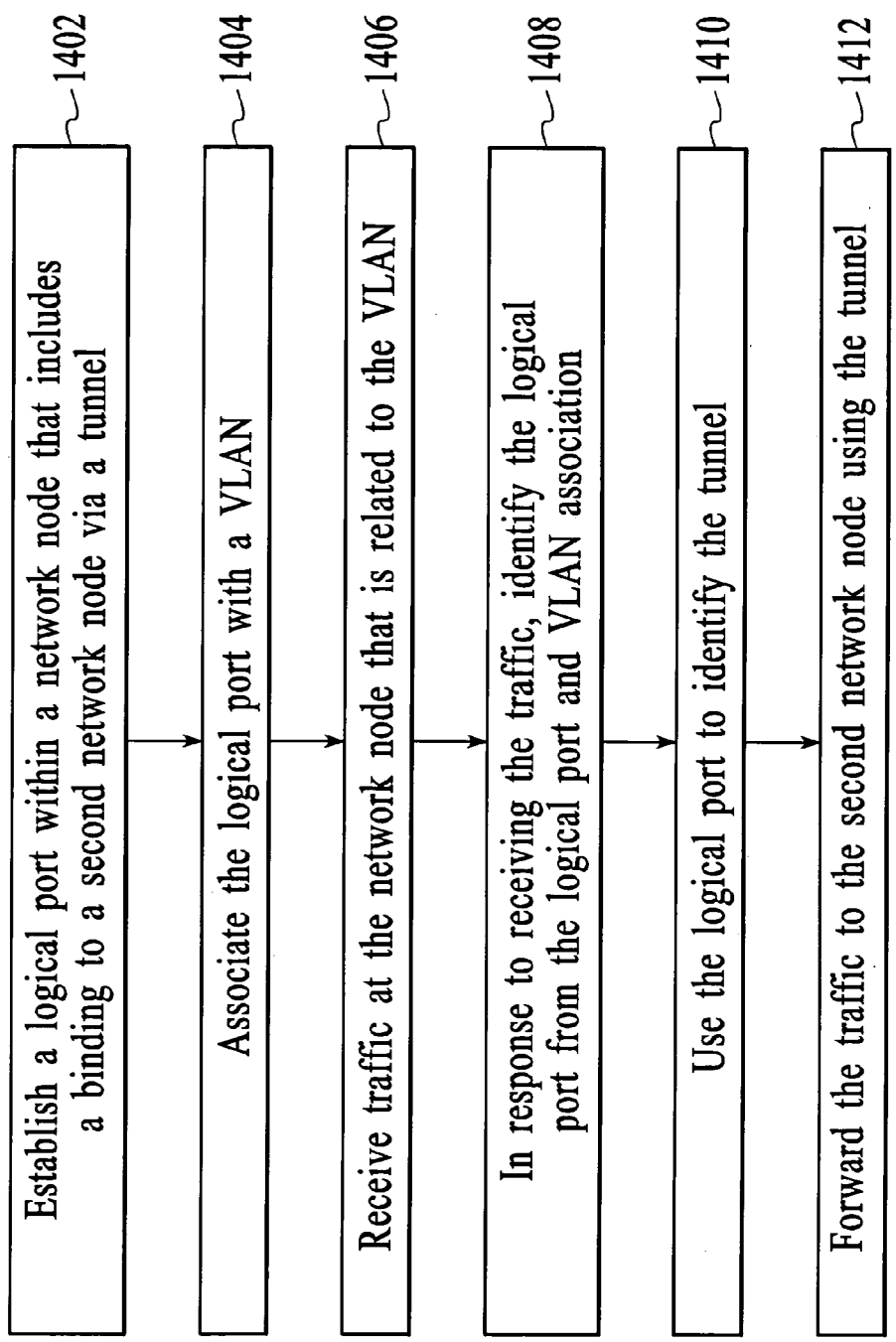
FIG. 14 depicts a process flow diagram of another method for managing VLAN traffic in a network node in accordance with an embodiment of the invention.

FIG. 14 depicts a process flow diagram of another method for managing VLAN traffic in a network node. According to the method, at step 1402, a logical port is established within a network node that includes a binding to a second network node via a tunnel. At step 1404, the logical port is associated with a VLAN. At step 1406, traffic that is related to the VLAN is received at the network node. At step 1408, the logical port is identified from the logical port and VLAN association is response to receiving the traffic. At step 1410, the logical port is used to identify the tunnel. At step 1412, the traffic is forwarded to the second network node using the tunnel.

Figure 15:
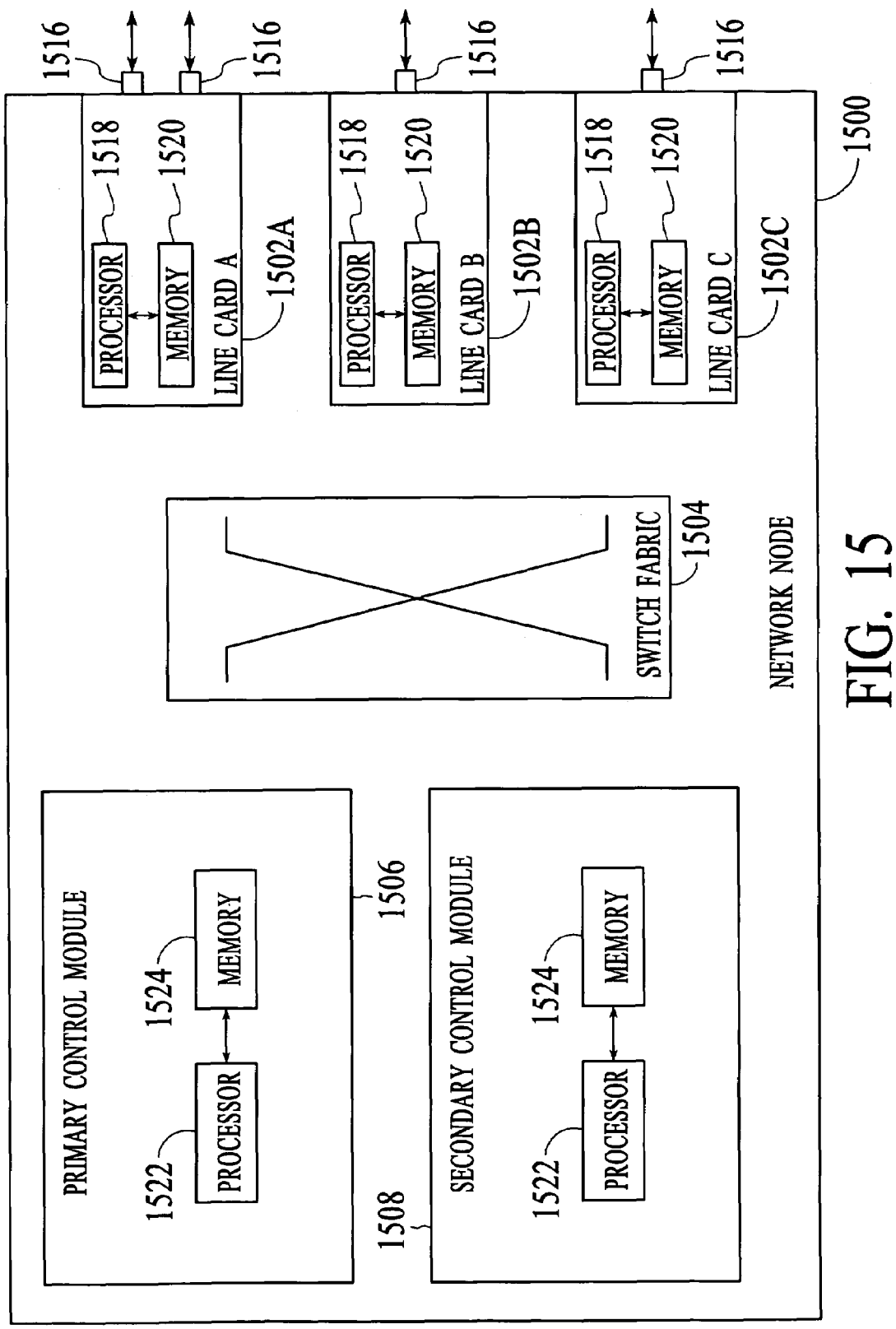
FIG. 15 depicts an embodiment of a network node in which an embodiment of the invention can be implemented.

FIG. 15 depicts an embodiment of a network node 100 in which an embodiment of the invention can be implemented. The example network node, which can be implemented as a service provider edge device, includes a primary control module 1506, a secondary control module 1508, a switch fabric 1504, and three line cards 1502A, 1502B, and 1502C (line cards A, B, and C). The network node handles traffic in discrete units, often referred to as datagrams. In an embodiment, the network node is an Ethernet switch/router that forwards traffic within the network node using Layer 2, Layer 3, and/or Layer 4 header information. The network node may include line cards that support network protocols such as Ethernet, ATM, and Frame Relay. Although an Ethernet-based switch/router is described, the disclosed logical port techniques can be applied to any network node that implements tunnels.

Each of the line cards includes at least one port 1516, a processor 1518, and memory 1520, which perform functions such as receiving traffic into the network node, buffering traffic, making forwarding decisions, and transmitting traffic from the network node. The processor within each line card may include a multifunction processor and/or an application specific processor that is operationally connected to the memory. The processor performs functions such as packet parsing, packet classification, and making forwarding decisions. The memory within each line card may include circuits for storing operational code, for buffering traffic, for storing logical port information, and for storing other data structures. Operational code is typically stored in non-volatile memory such as electrically erasable programmable read-only memory (EEPROM) or flash ROM while traffic and data structures are typically stored in volatile memory such as random access memory (RAM). Example data structures that are stored in the RAM include traffic forwarding information (i.e., exit port tables). Forwarding information may also be stored in content addressable memory (CAM) or a combination of CAM and RAM. Although the processor and memory are depicted as separate functional units, in some instances, the processor and memory are integrated onto the same device. In addition, there may be more than one discrete processor unit and more than one memory unit on the line cards.

The switch fabric 1504 provides datapaths between input ports and output ports and may include, for example, shared memory, shared bus, and crosspoint matrices. Although not depicted, the network node 1500 may be equipped with redundant switch fabrics.

The primary and secondary control modules 1506 and 1508 support various functions, such as network management functions and protocol implementation functions. Example network management functions that are performed by the control modules include implementing configuration commands, providing timing control, programming hardware tables, providing system information, supporting a user interface, managing hardware changes, bus management, managing logical ports, managing VLANs, and protocol processing. Example protocols that are implemented by the control modules include Layer 2 (L2) protocols, such as L2 Learning, STP, and LACP and Layer 3 (L3) protocols such as OSPF, BGP, and ISIS. The layers are defined by the ISO in the OSI model.

Each of the control modules 1506 and 1508 includes a processor 1522 and memory 1524 for carrying out the designated functions. The processor within each control module may include a multifunction microprocessor and/or an application specific processor that is operationally connected to the memory. The memory may include EEPROM or flash ROM for storing operational code and DRAM for buffering traffic and storing data structures, such as logical port information and VLAN tables. Although the processor and memory are depicted as separate functional units, in some instances, the processor and memory are integrated onto the same device. In addition, there may be more than one discrete processor unit and more than one memory unit on the control modules. Throughout the description, similar reference numbers may be used to identify similar elements.

Figure 16:
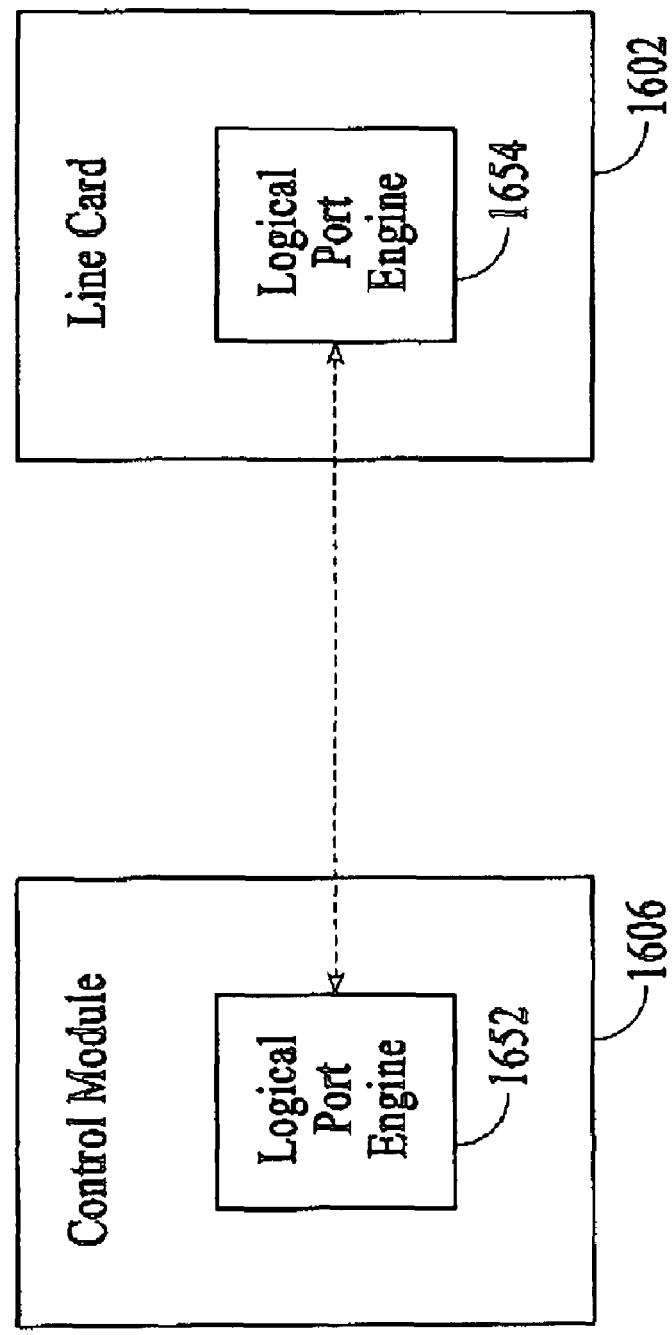
FIG. 16 illustrates a functional depiction of logical port engines that exist at a control module and a line card of a network node.

In an embodiment, the logical port functionality that is described above with reference to FIGS. 3-14 is implemented with the support of logical port engines that exist at the control modules and the line cards. FIG. 16 illustrates a functional depiction of logical port engines 1652 and 1654 that exist at a control module 1606 and a line card 1602 of a network node. The logical port engines may be embodied in a combination of software and hardware.

Although some of the broadcast domains are described as including only two ports (physical and or logical ports), it should be understood that the broadcast domains could include more than two ports.

Although specific embodiments of the invention have been described and illustrated, the invention is not to be limited to the specific forms or arrangements of parts as described and illustrated herein. The invention is limited only by the claims.

What is claimed is:

1. A method for managing virtual local area network (VLAN) traffic in a network node comprising:
    establishing a logical port within a network node that includes a binding to a tunnel;
    associating said logical port with a VLAN;
    receiving traffic at said network node that is associated with said VLAN;
    forwarding said traffic out of said network node using said logical port;
    wherein establishing said logical port includes binding said logical port to a dynamic multi-protocol label switched (MPLS) tunnel and a destination IP address and wherein the dynamic MPLS tunnel is an MPLS tunnel that does not specify a particular label switch path (LSP) that is to be used to reach a target destination and wherein the LSP that corresponds to the MPLS tunnel is dynamically determined by a label distribution protocol (LDP); and
    wherein said logical port includes a binding to a virtual circuit (VC) identifier (ID) that is to be used for a VC label in a layer 2 MPLS label stack.

2. The method of claim 1 wherein forwarding said traffic out of said network node using said logical port includes transmitting said traffic in said tunnel that is bound to said logical port.

3. The method of claim 1 wherein said VLAN is associated with a broadcast domain that includes said logical port.

4. The method of claim 1 wherein establishing said logical port includes binding said logical port to a physical port and a stacked VLAN tunnel.

5. The method of claim 4 wherein forwarding said traffic out said network node using said logical port includes transmitting said traffic out said physical port in said stacked VLAN tunnel.

6. The method of claim 5 wherein binding said logical port to said stacked VLAN tunnel includes identifying a VLAN ID that is to be added to outgoing packets.

7. The method of claim 6 wherein transmitting said traffic out said physical port in said stacked VLAN tunnel includes encapsulating said traffic with a header that includes said VLAN ID.

8. The method of claim 7 wherein said VLAN ID and said header that includes said VLAN ID conform to the IEEE 802.1Q standard.

9. The method of claim 1 wherein said MPLS tunnel is associated with a label switch path.

10. A system for managing virtual local area network (VLAN) traffic in a network node comprising:
   means for establishing a logical port within a network node that includes a binding to a tunnel;
   means for associating said logical port with a VLAN;
   means for forwarding VLAN traffic out of said network node using said logical port;
   wherein said means for establishing said logical port includes means for binding said logical port to a dynamic multi-protocol label switched (MPLS) tunnel and a destination IP address and wherein the dynamic MPLS tunnel is an MPLS tunnel that does not specify a particular label switch path (LSP) that is to be used to reach a target destination and wherein the LSP that corresponds to the MPLS tunnel is dynamically determined by a label distribution protocol (LDP); and
   wherein said logical Dort includes a binding to a virtual circuit (VC) identifier (ID) that is to be used for a VC label in a layer 2 MPLS label stack.

11. The system of claim 10 wherein said means for forwarding said traffic out of said network node using said logical port includes means for transmitting said traffic in said tunnel.

12. The system of claim 10 wherein said means for establishing said logical port includes means for binding said logical port to a physical port and a stacked VLAN tunnel.

13. The system of claim 12 wherein said means for forwarding said traffic out said network node using said logical port includes means for transmitting said traffic out said physical port in said stacked VLAN tunnel.

14. The system of claim 13 wherein said means for binding said logical port to said stacked VLAN tunnel includes identifying a VLAN ID that is to be added to outgoing packets.

15. The system of claim 14 wherein said means for transmitting said traffic out said physical port in said stacked VLAN tunnel includes means for encapsulating said traffic with a header that includes said VLAN ID.

16. The system of claim 15 wherein said VLAN ID and said header that includes said VLAN ID conform to the IEEE 802.1Q standard.

17. The system of claim 10 wherein said means for forwarding said traffic out said logical port includes means for transmitting said traffic in said MPLS tunnel.

18. A method for managing virtual local area network (VLAN) traffic in a network node comprising:
   establishing a logical port within a network node that includes a binding to a second network node via a tunnel;
   associating said logical port with a VLAN;
   receiving traffic at said network node that is related to said VLAN;
   in response to receiving said traffic, identifying said logical port from said logical port and VLAN association;
   using said logical port to identify said tunnel;
   forwarding said traffic to said second network node using said tunnel;
   wherein establishing said logical port includes binding said logical port to a dynamic multi-protocol label switched (MPLS) tunnel and a destination IP address and wherein the dynamic MPLS tunnel is an MPLS tunnel that does not specify a particular label switch path (LSP) that is to be used to reach a target destination and wherein the LSP that corresponds to the MPLS tunnel is dynamically determined by a label distribution protocol (LDP); and
   wherein said logical port includes a binding to a virtual circuit (VC) identifier (ID) that is to be used for a VC label in a layer 2 MPLS label stack.

19. The method of claim 18 wherein establishing said logical port includes binding said logical port to a physical port and a stacked VLAN tunnel.

20. The method of claim 19 wherein forwarding said traffic using said tunnel includes forwarding said traffic out said physical port in said stacked VLAN tunnel.

21. A method for managing traffic in a network node that includes multiple physical ports comprising:
   establishing a logical port within a network node that includes a binding to a tunnel;
   treating the logical port the same as the physical ports of the network node in the forwarding of traffic through the network node;
   wherein establishing said logical port includes binding said logical port to a multi-protocol label switched (MPLS) tunnel and a destination IP address and wherein the dynamic MPLS tunnel is an MPLS tunnel that does not specify a particular label switch path (LSP) that is to be used to reach a target destination and wherein the LSP that corresponds to the MPLS tunnel is dynamically determined by a label distribution protocol (LDP); and
   wherein said logical port includes a binding to a virtual circuit (VC) identifier (ID) that is to be used for a VC label in a layer 2 MPLS label stack.

22. The method of claim 1 wherein said VCID is allocated from a range of 4,096-65,535, both numbers inclusive.

23. The method of claim 10 wherein said VCID is allocated from a range of 4,096-65,535, both numbers inclusive.

24. The method of claim 1 further comprising changing the particular LSP that is utilized by the dynamic MPLS tunnel in response to traffic conditions.

25. The system of claim 10 wherein the particular LSP that is utilized by the dynamic MPLS tunnel is changed in response to traffic conditions.

* * * * *